United States Patent [19]

Li

[11] 4,370,552
[45] Jan. 25, 1983

[54] METHOD FOR ORE PROSPECTING

[76] Inventor: Chou H. Li, 379 Elm Dr., Roslyn, N.Y. 11576

[21] Appl. No.: 202,706

[22] Filed: Oct. 31, 1980

[51] Int. Cl.³ ............................................. G01V 5/00
[52] U.S. Cl. ................................................. 250/253
[58] Field of Search ............... 250/253, 254, 304, 256; 23/230 EP; 73/152

[56] References Cited

PUBLICATIONS

Li, C. H., "Normal Freezing with Cubic Liquidus and Solidus Lines", *J. Appl. Phys.*, vol. 39, No. 4, pp. 2094–2097, (1968).

*Primary Examiner*—Alfred E. Smith
*Assistant Examiner*—Janice A. Howell

[57] ABSTRACT

A method for ore prospecting comprises: locating the ore body, determining the concentration values of a selected chemical element at two positions in the ore body; measuring the distance between the two positions; estimating the freezing segregation behavior of the selected element during the freezing of the ore body; and from the determined concentration values, measured distance, and estimated freezing segregation behavior calculating the size of the ore body.

25 Claims, 4 Drawing Figures

METHOD FOR ORE PROSPECTING

FIELD

The invention relates to prospecting for valuable minerals and more particularly to methods for evaluating the size and value of an at least partially hidden, frozen ore body containing the valuable minerals.

PRIOR ART

In conventional ore prospecting, a region likely to contain the desired, valuable minerals is first located. Holes are then drilled at selected locations. The drill cores provide samples and data to determine the ore thickness and assay value at the various drill locations. The mineral reserve may then be estimated. For example, if the ore body measures L feet long by W feet wide by T feet thick and assays at D dollars per cubic foot, then the ore body has a total volume of $L \times W \times T$ cubic feet and worth $L \times W \times T \times D$ dollars.

Often, however, the ore body is irregular, being very narrow or thin, or practically disappearing at places. Many valuable ore bodies were formed by a mass of molten rock (or magma) containing the valuable minerals and penetrating through fractures or fissures created in the bedrock by, e.g., a major or minor earthquake. These fractures or fissures follow the lines of least resistance in the bedrock and, hence, are often very irregular. The resultant ore body or bodies are thus also irregular, being nonplanar, non-linear, zigzagging, or otherwise following unpredictable patterns and making the intelligent selection of drill locations difficult if not practically impossible. A thin vein of high mineral content may, for example, bend, curve, meander, and/or thin out in one region. The size and value (or mineral content) of such and other similar ore bodies often cannot be determined. The mining of such ore bodies usually becomes too risky to be undertaken.

SUMMARY

Accordingly, an object of the invention is to provide a simple but reliable method for estimating the size and value of a hidden, frozen ore body.

A further object of the invention is to provide a method of estimating the size and value of an irregular, frozen ore body which unpredictably changes in shape, size, dip, orientation from place to place.

A broad object of the invention is to provide a method of computing the size and value of portions of a frozen ore body which remains hidden in the ground, or has been removed by weathering or previous mining operation.

Other objects and advantages of this invention will further become apparent hereinafter and in the drawing.

To these ends, the present invention provides a method for estimating the size and value of a hidden, frozen ore body which comprises determining the concentration values of a selected element at a number of positions in the ore body; estimating the freezing segregation behavior of the selected element, and calculating the desired size and value of the ore body.

BRIEF DESCRIPTION

The invention and its further objects and features will be more clearly understood from the following detailed description taken in conjunction with the drawing in which.

Figure 1:
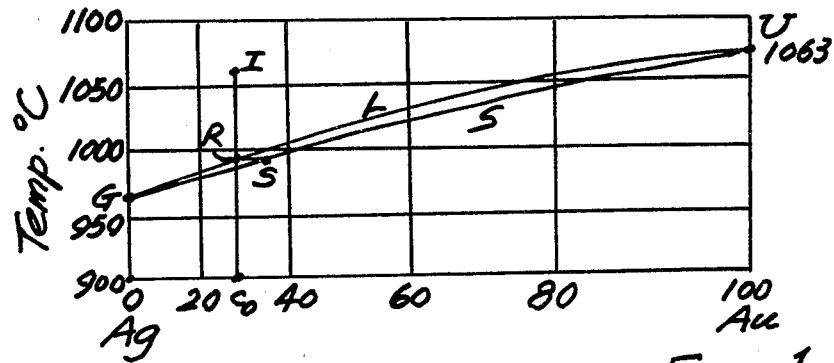
FIG. 1 is a gold-silver phase diagram from which the freezing segregation behavior of gold-silver alloys can be computed.

It will be understood that although the following method is described in terms of a particular gold-silver system, the steps of the method may be performed on ore bodies of other metal systems, or even of systems of metals with oxides, sulfides, fluorides, chlorides, iodides, or the like. That is, the invention is not necessarily limited to the precise processing steps and techniques or melt compositions here shown.

DETAILED DESCRIPTION

It will be understood that the specific embodiments described are merely illustrative of the general principles of the invention and that various modifications are feasible without departing from the spirit and scope of the invention. That is, the invented method is of general applicability for simplifying the prospecting of frozen ore bodies.

More particularly, it will be evident that the invention may be employed to prospect for ore bodies of different types, some of which are not even mentioned in this specification. It will also be apparent that measuring, estimating, determining, and analytical techniques other than those specifically mentioned obviously may be used instead.

In describing the preferred embodiments of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

Many ore bodies containing valuable minerals were formed by igneous molten rock (magma) intrusion into bedrocks followed by freezing with the associated segregation or concentration of the valuable minerals (or chemical elements) during such freezing. This is called freezing segregation and can be seen by the use of a phase diagram, such as FIG. 1 for silver in gold.

This figure is a temperature versus composition plot. It gives the gold concentration, in weight percent (or w/o) in the liquid melt (or molten magma) as shown by the liquidus line GLU, which is in equilibrium at the same temperature with the freezing solid (or segregated-out minerals) as shown by the solidus line GSU.

Thus, according to FIG. 1, except for pure silver or gold which by definition must solidify into pure (100%) and homogeneous, silver or gold, respectively all other compositions must segregate or have non-uniform compositions at different fractions p solidified. Gold, having a higher melting point of 1063° C. as compared to silver which melts at 960.5° C., comes out first or initially in richer forms than the original melt composition $c_o$. As shown in the phase diagram, an ore body containing a molten melt of 75 w/o silver (or weight percent) and 25 w/o gold remains completely molten until a temperature of about 990° C. is reached (See intersection point R of the vertical cooling line passing through the initial concentration line $c_o$ and the liquidus GLV) when the first layer of material to freeze out has a composition shown by the solidus GSU at the same temperature, i.e., at the intersection point S representing about 62 w/o silver and 38 w/o gold and not 75 w/o silver and 25 w/o gold. The gold-enriched and solidified first layers deplete the remaining molten ore body of its gold. Hence, both the remaining molten ore body and the subsequently frozen layers, following respectively the liquidus line GLU to the left of point R and the solidus line GSU to the left of point S, contain progressively less and less gold, or more and more silver. These layers freeze out at progressively lower and lower melt temperatures. The last layer or portion to freeze must be 100 w/o silver at 960.5° C., the melting point of silver.

To quantitatively evaluate the freezing segregation behavior of various silver-gold alloys, however, several freezing models must first be explained. In normal freezing, one assumes no solid diffusion but complete liquid diffusion. Also, the compositions of the freezing solid and remaining melt, $c_s$ and $c_l$, respectively, must follow the solidus and liquidus curves of the phase diagram.

When both the solidus and liquidus curves can be represented by straight lines in the entire freezing range treated, one may exactly describe the elemental segregation behavior by a linear, normal freezing equation as follows:

$$c_s = kc_o(1-p)^{k-1}$$

where $c_s$ is the elemental concentration of the frozen solid at the point where a fraction p of the original melt or magma (of initial concentration $c_o$) has solidified, and k is the constant segregation coefficient, which is the ratio of the slope of the solidus line to that of the liquidus line.

As shown by Li's paper in Journal of Applied Physics, Vol. 39, No. 4, pp 2094–2097, 1968, any phase diagram whose solidus and liquidus lines can be represented by reasonable polynomial functions of the melt temperature allows the exact calculation of the normal freezing, segregation behavior, thus:

$$1 - p = \prod_{i=1}^{n} [(T_o - T_i)/(T - T_i)]^{Q_i}$$

where $T_o$ is the modified, initial freezing temperature, p is the fraction solidified, $T_i$'s are the roots of the polynomials representing the solidus and liquidus lines, and $Q_i$'s are the numerators of the various partial fractions, as given by the abovementioned Li's paper.

Normal freezing, which gives maximum freezing segregation, is a useful and important ideal limiting case, as is infinitely rapid quench or splat cooling. In this rapid freezing process, time is not allowed for any solid and liquid diffusion, or even equilibration according to the phase diagram, resulting in no freezing segregation in the extreme case. Another useful and limiting freezing process is equilibrium freezing according to the lever rule (See Chalmers: *Solidification*, Wiley, 1969) when both the liquid and solid diffusions are complete. Any actual freezing results must fall within these maximum segregation, no segregation, and equilibrium segregation limits. For some alloys, the limits between maximum and equilibrium segregation results may be only a few percent apart (See Li in Physics Status Solidi, Vol. 15, p42, 1966). Further, the relative proximity of practical freezing results to either of these limits can often be predicted by a study of the freezing conditions, or even quantitatively estimated by examining the grain size and other characteristics of the frozen solid to determine the corrections in the freezing computations for deviations of the actual freezing from the assumed normal freezing. Such corrections can also be obtained by comparing the computed concentration profiles or segregation behavior with an actually measured concentration profile or segregation behavior on. e.g., an isolated frozen rod, sphere, or cylinder. A constant factor for percentage addition or substraction, or for multiplication, may then be applied to the computed freezing segregation results to enhance their accuracy for the actual ore freezing conditions.

The above normal freezing equations can be used to compute the freezing segregation behavior of various melts or molten ore bodies having known initial concentrations, if the relevent phase diagrams are available or can be calculated from basic thermodynamic data (such as the melting points and heats of formation of the elements). The following table shows, at the different fractions solidified p from 0.1 (or 10%) to 1.0 (or 100%) and for initial silver concentrations $c_o$ of 70 to 80 w/o, the silver concentrations (in weight percent) at the freezing layer, in the remaining melt or magma, or in the solidified ore body. All these a concentration values, all in weight percent or w/o, except for those in the third column, were computed with a set of quadratic solidus and liquidus and a non-linear normal freezing equation given above. Concentration values in the third column were computed with a set of straight-line solidus and liquidus lines and the linear (or constant segregation coefficient) normal freezing equation also given above. The last two columns (Columns 9 and 10) give the computed silver concentrations for the freezing layers at the respective radius ratios (See FIG. 2) given in Column 8:

TABLE I

| | Freezing segregation behavior of Ag—Au Melts: | | | | | | | | |
|---|---|---|---|---|---|---|---|---|---|
| | Freezing layer | | Ag in liquid | | Silver in solid | | | Freezing layer, 70% | |
| p | 70%, Quad. | 70%, Linear | 70% | 80% | 70% | 80% | $r/r_o$ | Cylind. | Sphere |
| 0.1 | 60.5 | 52.5 | 71.1 | 80.9 | 60.7 | 71.9 | 0.9 | 72.3 | 73.5 |
| 0.3 | 63.6 | 56.2 | 73.9 | 83.1 | 61.0 | 72.7 | 0.7 | 77.4 | 80.8 |
| 0.5 | 67.5 | 61.6 | 77.2 | 85.6 | 62.8 | 74.4 | 0.5 | 83.9 | 88.8 |
| 0.7 | 73.4 | 70.7 | 82.1 | 89.1 | 64.8 | 76.1 | 0.3 | 90.8 | 95.7 |
| 0.9 | 84.2 | 95.3 | 90.2 | 94.7 | 67.8 | 78.4 | 0.1 | 97.8 | ~100.0 |
| 1.0 | 100.0 | 100.0 | 100.0 | 100.0 | 70.0 | 80.0 | 0.0 | 100.0 | 100.0 |
| Col.1 | 2 | 3 | 4 | 5 | 6 | 7 | 8 | 9 | 10 |

The invented method for evaluating the size and value of a partially hidden, frozen ore body thus typically comprises: locating a portion of the ore body; determining the concentration values of a selected chemical element at two positions in the ore body; measuring the distance between the two positions; estimating the freezing segregation behavior of the selected element during the freezing of the ore body; and from the determined concentration values, measured distance, and estimated freezing segregation behavior calculating the size of the still hidden portion of the ore body.

The selected element may be a pure metal such a gold, silver, . . . and the ore body contains this metallic element in freezing segregated form. The selected element may also be a non-metal, such as oxygen, sulfur, chlorine, fluorine, and iodine. These elements form with metals, respectively, oxides, sulfides, chlorides, fluorides, and iodides. The phase diagram for some of these elements with metals (silver, iron, for example) have even been determined and published. The selected element may also occur in the ore body in the form of a chemical or metallurgical compound having a fixed composition, such as an eutectic compound or an intermetallic compound including: AuZn, AuSn, $AuSn_2$, $AuSn_4$, $AuSb_2$, PrAu, $PrAu_2$, $PrAu_3$, MnAu, MgAu, $Mg_2Au$, $Mg_3Au$, AuIn, $AuIn_2$, AuGa, $AuGa_2$, AuCd, $AuCd_3$, and the like with metals other than gold.

Two examples of the use of the invention will now be described:

EX. 1

Figure 2:
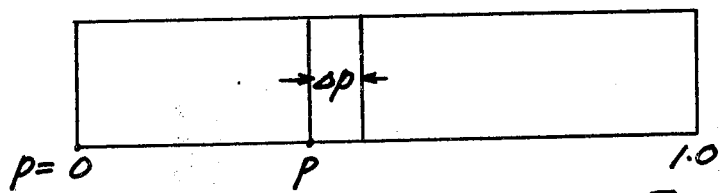
FIG. 2 shows an elongated ore body frozen directionally from one end toward the other.

A silver-gold ore body was found to freeze out downwardly (along the freezing direction FD in FIG. 2) from an original melt containing 70 w/o Ag and 30 w/o Au. The ore body is elongated and roughly uniform in cross-section (FIG. 2). The ore body has a concentration of 60.5 w/o Ag at the earth surface but changes to 63.6 w/o Ag 100 feet down. The second column in Table I shows that the surface corresponds to a fraction solidified p of 0.10 (or 10%), while the position 100 feet down a fraction solidified p of 0.3. Since $\Delta p = 30\% - 10\% = 20\%$ or 0.20 of the ore body length measures 100 feet, the entire ore body length before freezing must therefore be: 100 feet/20% = 500 feet. Apparently, the top 10% of the ore body has been removed (i.e., 50 feet containing 60.7 w/o Ag and 39.3 w/o Au as shown in column 6 of Table I), e.g., by weathering and would having to be recovered by tracing downhill or down some rivers passing through the region. On the other hand, the underground ore body should extend 450 feet deep, represent 90% of the original ore body, and have an average concentration of, according to column 4 in Table I, 71.1 w/o Ag and 28.9 w/o Au.

EX. 2

Figure 3:
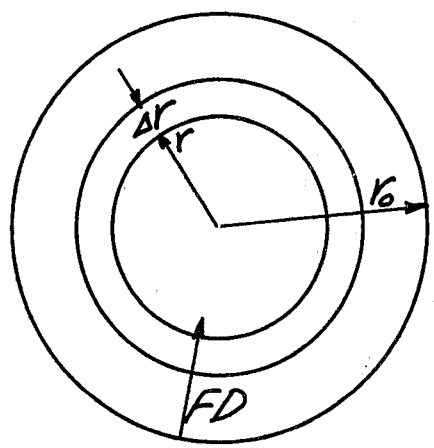
FIG. 3 shows a cylindrical or spherical ore body frozen from the outer surface radially inward.
Figure 4:
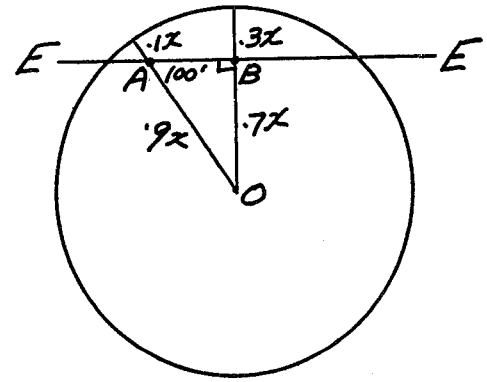
FIG. 4 shows a sketch used in the computation of the size of an underground, spherical ore body.

A roughly spherical ore body was found to have frozen from the spherical surface radially inward toward the center (along the freezing direction FD in FIG. 3), from a similar melt containing 70 w/o Ag and 30 w/o Au. The ore body has a surface concentration of 80.8 w/o Ag at the center but only 73.5 w/o Ag at a point 100 feet horizontally away. Column 10 in the above table shows that the center point corresponds to a radius ratio of 0.7 while the second point 100 feet away corresponds to a radius ratio of 0.9. FIG. 4 shows that if the radius of the original Ag-Au ore body was x feet, then in the OAB right-angle triangle, $(0.9x)^2 - (0.7x)^2 = 100^2$ whence x = 177 feet. Thus, the 354-foot sphere of ore body has been weathered 30% of its radius of 177 feet ($0.30 \times 177 = 53.1$ feet) at the top, but 93.9% of the volume of the original ore body still remains underground ready to be mined.

The concentration values of the selected element to be determined may be the absolute, localized concentrations at the two positions, such as the silver concentrations in the freezing layers at the two different positions or fractions solidified p given, for example, in columns 2, 3, 9, and 10 of Table I. Alternately, the concentration values may be the culmulative concentrations of the selected element from a terminal freezing position (p or $r/r_o = 0$ or 1) up to the positions represented by the respective p or $r/r_o$, such as those given in columns 4-7 of Table I. In another alternative, the concentration values may be the total concentrations of the selected element in two regions of a prespecified volume ($\Delta r$ or $\Delta p$ in FIGS. 3 or 2) but centered around the two positions. Thus, in the first example above, a volume of 20% of the ore body centered at p = 0.2 has an average silver content in the liquid of $(0.711 \times 0.9 - 0.739 \times 0.7) \times W = 0.123$ W (See column 4 in Table I) where W is the weight of the original molten ore body before freezing.

The concentration values can be determined by chemical analyses using standard wet analyses, fire assay, atomic absorption or other instrumental analyses. In certain cases, the selected element may be radioactive (e.g., U), magnetic (Fe, Ni), light-emitting (P), . . . , the required concentration values may then also be determined by radioactive, magnetic, light, . . . counting.

The initial concentration $c_o$ of the molten ore body before freezing may be determined by examining a nearby ore body which is geologically related to the ore body in question, such as when the original melt splitted into two ore bodies before freezing. Alternately, additional concentration values may be collected at points other than the two positions, to provide data for estimating the initial concentration, the normality of freezing, the correction to the computed normal freezing segregation behavior, and even the (concentration)-determining or (distance-) measuring errors. Modification of the segregation behavior after the freezing may also be similarly estimated or correlated with actual experimental data or field observations. Least square techniques should then be developed and used to handle these collected data whose number is greater than the number of unknowns. It can be seen that the method of this invention can even be used to treat irregular ore bodies that change shape, size, dip, and orientation at places.

The invention is not to be construed as limited to the particular forms disclosed herein, since these are to be regarded as illustrative rather than restrictive. Skilled persons in the art will have occasions to practice numerous variations on specific features of the invention. It is my desire that all such variations fall within the spirit and scope of the invention as defined by the following claims:

I claim:

1. A method for evaluating the size and value of an at least partially hidden, frozen ore body comprising:
    locating a portion of said ore body;
    determining the concentration values of a selected chemical element at two positions in said ore body;
    measuring the distance between said two positions;
    estimating the freezing segregation behavior of said selected element during the freezing of said ore body; and
    from said determined concentration values, measured distance, and estimated freezing segregation behavior calculating the size of the still hidden portion of said ore body.

2. The method as in claim 1 wherein said selected element is a pure metal and said ore body contains said selected element in freezing segregated form.

3. The method as in claim 1 wherein said selected element is a non-metal selected from the group consisting of oxygen, sulfur, chlorine, fluorine, and iodine.

4. The method as in claim 1 wherein said selected element occurs in said ore body in the form of a compound having a substantially fixed composition.

5. The method as in claim 1 wherein said ore body is elongated and was frozen from one end toward the other, and said estimating step comprises estimating the freezing segregation behavior of said selected element during the directional freezing of said ore body toward the cylindrical axis.

6. The method as in claim 1 wherein said ore body is generally spherical in shape and said estimating step comprises estimating the freezing segregation behavior of said selected element during the generally radially inward freezing of said ore body.

7. The method as in claim 1 wherein said ore body is generally cylindrical in shape and was frozen from the outer cylindrical surface toward the axis of the cylinder and said estimating step comprises estimating the freezing segregation behavior of said selected element during the generally radially inward freezing of said ore body.

8. The method as in claim 1 wherein said estimating step comprises computing said freezing segregation behavior based on the phase diagram of said selected element and at least another substance contained in said ore body.

9. The method as in claim 8 wherein during said computing step a normal freezing process is assumed.

10. Thet method as in claim 9 including examining the grain size and other characteristics of said ore body to determine the corrections in said computing step for deviations of the actual freezing from said normal freezing of said ore body.

11. The method as in claim 9 wherein during said computing step the phase diagram is approximated by two straight lines respectively representing the solidus and liquidus lines, and the following linear, normal freezing equation is used:

$$c_s = kc_o(1-p)^{k-1}$$

where $c_s$ is the concentration of said selected element at the location where a fraction p of said ore body has solidified, $c_o$ is the initial concentration of said selected element in said ore body before freezing, and k is the constant freezing segregation coefficient of said selected element in the molten ore body as given by the ratio of the slopes of the two approximating solidus and liquidus straight lines.

12. The method as in claim 9 wherein during said computing step the solidus and liquidus curves on the phase diagram are represented by two polynormial curves and the following non-linear, normal freezing equation is used:

$$1 - p = \prod_{i=1}^{n} [(T_o - T_i)/(T - T_i)]^{Q_i}$$

where $T_o$ is the modified, initial freezing temperature, p is the fraction solidified, $T_i$'s are the roots of the polynomials representing the solidus and liquidus lines, and $Q_i$'s are the numerators of the various partial fractions.

13. The method as in claim 1 wherein said concentration values are the absolute, localized concentrations of said selected element at said two positions.

14. The method as in claim 1 wherein said concentration values are the total concentrations of said selected element in two regions of a specified volume and centered respectively around said two positions.

15. The method as in claim 1 wherein said concentration values are the culmulative concentrations of said selected element totaled from a terminal freezing position up to said two positions.

16. The method as in claim 1 wherein said determining step is done by chemical analyses for said selected element.

17. The method as in claim 1 wherein said element is radioactive and said determining step is done by radioactive counting of said selected element.

18. The method as in claim 1 including determining the initial concentration of said selected element in said ore body in its molten state and before freezing, by reference to a nearby ore body geologically related to said ore body.

19. The method as in claim 1 including additionally determining the concentration values of said selected element at positions other than said two positions to provide data for determining the initial concentration of said selected element in said ore body before freezing.

20. The method as in claim 1 wherein part of said ore body has been removed and including estimating the amount removed from said ore body.

21. The method as in claim 1 wherein said selected element occurs in the ore body in the form of a chemical or metallurgical compound having a fixed composition.

22. The method as in claim 1 wherein said selected element occurs in the ore body in the form of a eutectic compound.

23. The method as in claim 1 wherein said selected element occurs in the ore body in the form of an intermetallic compound including one selected from the group consisting of: $AuZn$, $AuSn$, $AuSn_2$, $AuSn_4$, $AuSb_2$, $PrAu$, $PrAu_2$, $PrAu_3$, $MnAu$, $MgAu$, $Mg_2Au$, $Mg_3Au$, $AuIn$, $AuIn_2$, $AuGa$, $AuGa_2$, $AuCd$, and $AuCd_3$.

24. The method as in claim 1 wherein said selected element occurs in the ore body in the form of an intermetallic compound.

25. The method as in claim 1 wherein said determining step is done by a physical method of analysis.

* * * * *